(12) United States Patent
Diard

(10) Patent No.: US 8,295,621 B1
(45) Date of Patent: Oct. 23, 2012

(54) DATA DECOMPRESSION USING A GEOMETRY SHADING UNIT

(75) Inventor: Franck R. Diard, Mountain View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1348 days.

(21) Appl. No.: 11/956,313

(22) Filed: Dec. 13, 2007

(51) Int. Cl.
*G06K 9/36* (2006.01)
*G06K 9/46* (2006.01)

(52) U.S. Cl. ........ 382/233; 382/232; 382/235; 382/250; 382/251; 382/274

(58) Field of Classification Search .................. 382/232, 382/233, 235, 250, 251, 274, 260; 345/428, 345/419, 420, 423
See application file for complete search history.

(56) References Cited

U.S. PATENT DOCUMENTS

| | | |
|---|---|---|
| 6,002,411 A | 12/1999 | Dye |
| 6,243,081 B1 * | 6/2001 | Goris et al. .................. 345/555 |
| 6,525,722 B1 | 2/2003 | Deering |
| 7,202,872 B2 * | 4/2007 | Paltashev et al. ............. 345/555 |
| 8,040,351 B1 * | 10/2011 | Diard ............................ 345/426 |
| 2002/0091892 A1 * | 7/2002 | Vondran, Jr. ...................... 711/3 |
| 2005/0122334 A1 | 6/2005 | Boyd et al. |

OTHER PUBLICATIONS

Office Action in U.S. Appl. No. 11/956,315 mailed Feb. 16, 2011.
Non-Final Office Action, U.S. Appl. No. 11/956,312 dated Nov. 23, 2011.

* cited by examiner

*Primary Examiner* — Ali Bayat
(74) *Attorney, Agent, or Firm* — Patterson & Sheridan, LLP

(57) ABSTRACT

A system and method uses the capabilities of a geometry shader unit within the multi-threaded graphics processor to offload data compression computations from a central processing unit (CPU), reduce the memory needed to store image data, and reduce the bandwidth needed to transfer image data between graphics processors and between a graphics processor and a system memory. The multi-threaded graphics processor is also configured to perform decompression of the variable length compressed data using the geometry shader unit.

20 Claims, 18 Drawing Sheets

| 910 | 911 | 912 | | | | | |
|---|---|---|---|---|---|---|---|
| 920 | 921 | 922 | 923 | 924 | 925 | | |
| 930 | 931 | 932 | 933 | 934 | 935 | 936 | 937 |
| 940 | 941 | | | | | | |

Sparse Compressed Data 900

Figure 9A

| 910 | 911 | 912 | 920 | 921 | 922 | 923 | 924 | 925 | 930 | 931 | 932 |
|-----|-----|-----|-----|-----|-----|-----|-----|-----|-----|-----|-----|
| 933 | 934 | 935 | 936 | 937 | 940 | 941 |     |     |     |     |     |

Packed Compressed Data
950

Figure 9D

DATA DECOMPRESSION USING A GEOMETRY SHADING UNIT

FIELD OF THE INVENTION

Embodiments of the present invention relate generally to using a multi-threaded graphics processor configured as a geometry shader to implement decompression of variable length compressed data.

DESCRIPTION OF THE RELATED ART

Conventionally, graphics processors are used for computer graphics. New capabilities allow multi-threaded graphics processors to be used for other domains that benefit from the massively parallel architecture. Recently, multi-threaded graphics processors include support for a geometry shader unit as specified by Microsoft's DirectX 10. Unlike the vertex shader and fragment shader of conventional graphics processors, the geometry shader unit is able to add or delete some elements in the geometry stream. Therefore, the geometry shader unit may be used to implement algorithms with variable input and output, such as general purpose algorithms that are outside of the conventional domain of processing geometry.

Accordingly, what is needed in the art is a system and method for using the capabilities of the geometry shader unit to implement algorithms with variable input and output. In particular, systems and methods for using the geometry shader to compress image data can offload data compression computations from a central processing unit (CPU), reduce the memory needed to store image data, and reduce the bandwidth needed to transfer image data between graphics processors and between a graphics processor and a system memory.

SUMMARY OF THE INVENTION

A system and method for using the capabilities of a geometry shader unit within the multi-threaded graphics processor to compress data using algorithms that produce variable length output. A single vertex may be sent to the geometry shader unit for processing by a single computational thread to emit a variable length output including an adaptive number of scalar values representing compressed data. Alternatively, multiple vertices may be sent to the geometry shader unit in order to process the data in parallel using multiple computational threads to emit variable length outputs representing the compressed data. The geometry shader unit may also be configured to decompress the variable length compressed data to restore the data. Alternatively, a CPU may be configured to decompress the compressed data. The bandwidth needed to transfer the data between graphics processors and between a graphics processor and the CPU may be reduced by transferring compressed data. Similarly, the memory needed to store the data may be reduced by stored the data in the compressed format.

Various embodiments of a method of the invention for using a geometry shader unit to decompress variable length compressed data and restore the data include receiving an input vertex that specifies the variable length compressed data of a first length, reading the variable length compressed data, and decompressing the variable length compressed data using the geometry shader unit to produce the data of a second length, wherein the second length is greater than the first length.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 9A is an output buffer storing sparse compressed data in accordance with one or more aspects of the present invention;

FIG. 9D is an output buffer storing compressed data in accordance with one or more aspects of the present invention.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
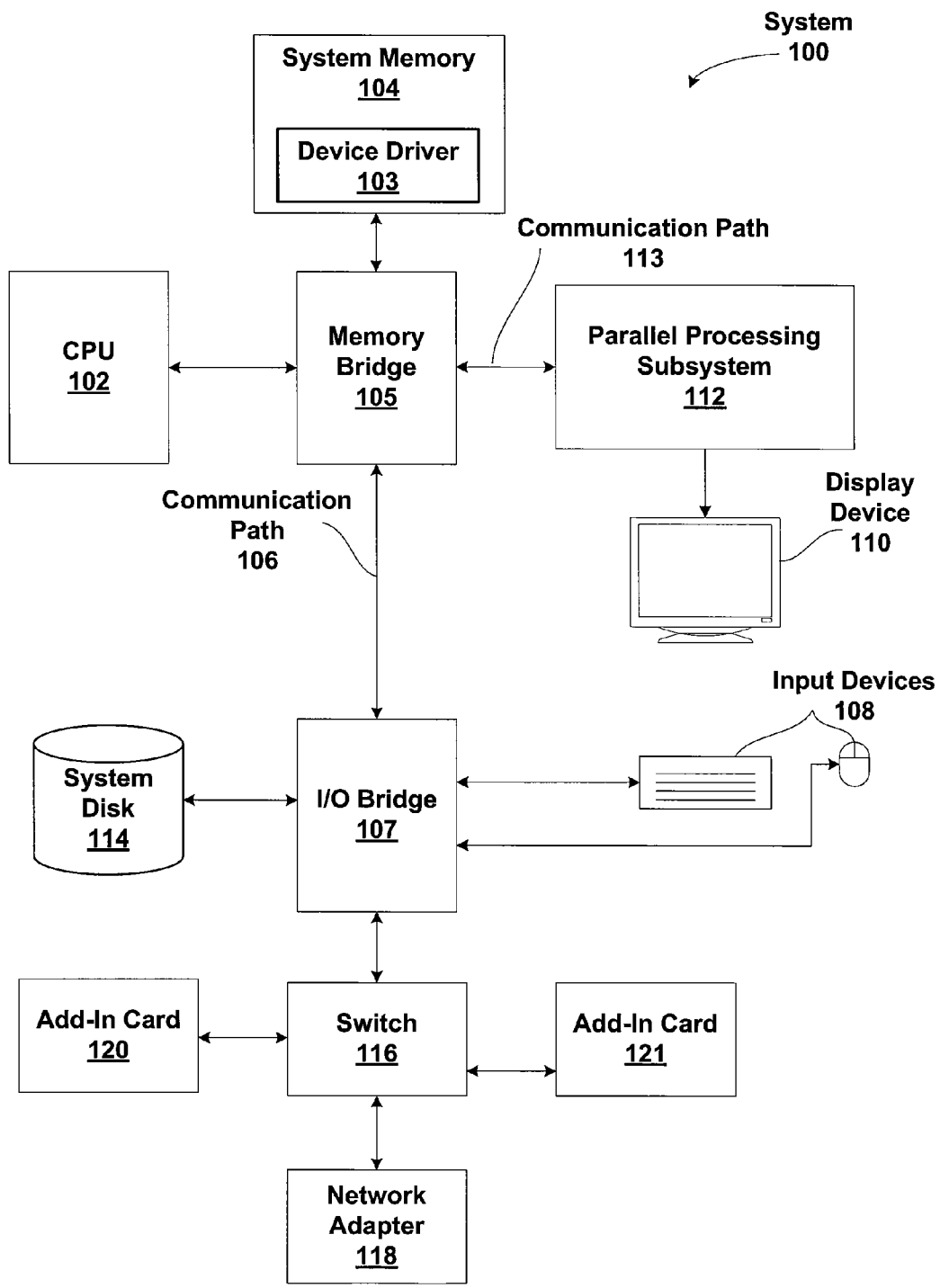
FIG. 1 is a block diagram illustrating a computer system configured to implement one or more aspects of the present invention.

FIG. 1 is a block diagram illustrating a computer system configured to implement one or more aspects of the present invention. FIG. 1 is a block diagram of a computer system 100 according to an embodiment of the present invention. Computer system 100 includes a central processing unit (CPU) 102 and a system memory 104 communicating via a bus path that includes a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A device driver 103 that is stored in system memory 104, interfaces between processes executed by CPU 102, such as application programs, and parallel processing subsystem 112, translating program instructions as needed for execution by parallel processing subsystem 112.

A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

Parallel processing subsystem 112 may be configured to perform lossless compression using a geometry shading unit. It is advantageous to compress data that is transferred over communication path 113 in order to minimize the bandwidth capacity requirements of communication paths 113 and 106 or to reduce the bandwidth consumed when data is transferred from parallel processing subsystem 112 to system memory 104 or I/O bridge 107. Additionally, it is desirable to minimize the memory footprint of data stored in parallel processing subsystem 112 and system memory 104. Therefore, parallel processing subsystem 112 is configured to compress data and output compressed data to system memory 104 and/or I/O bridge 107, as described further herein. Parallel processing subsystem 112 and CPU 102 may each be configured to decompress the compressed data to restore the data exactly since the compression is lossless.

Figure 2:
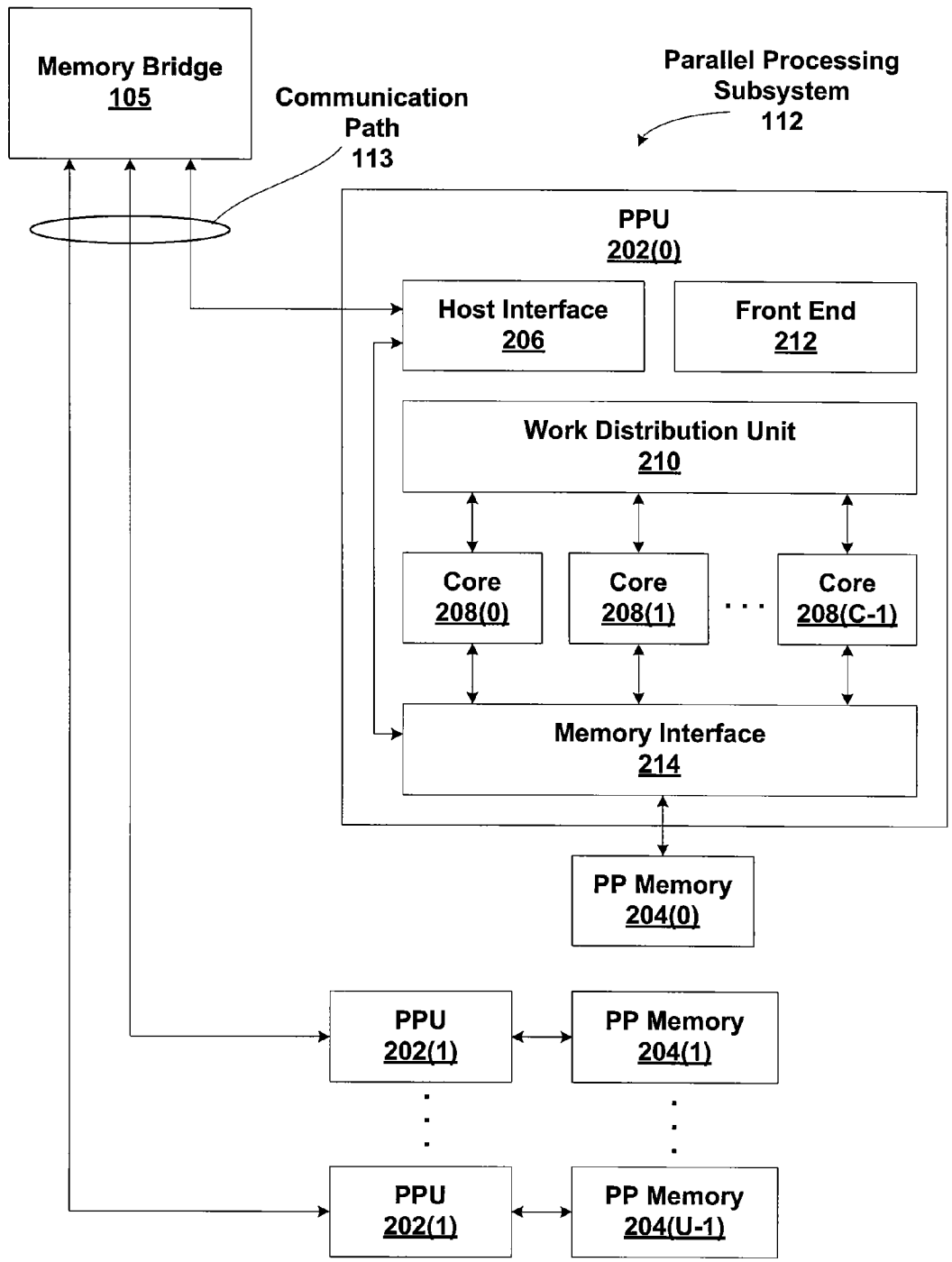
FIG. 2 is a block diagram of a parallel processing subsystem for the computer system of FIG. 1 in accordance with one or more aspects of the present invention.

An embodiment of parallel processing subsystem 112 is shown in FIG. 2. Parallel processing subsystem 112 includes one or more parallel processing units (PPUs) 202, each of which is coupled to a local parallel processing (PP) memory 204. In general, a parallel processing subsystem includes a number U of PPUs, where $U \geq 1$. (Herein, multiple instances of like objects are denoted with reference numbers identifying the object and parenthetical numbers identifying the instance where needed.) PPUs 202 and PP memories 204 may be implemented, e.g., using one or more integrated circuit devices such as programmable processors, application specific integrated circuits (ASICs), and memory devices.

As shown in detail for PPU 202(0), each PPU 202 includes a host interface 206 that communicates with the rest of system 100 via communication path 113, which connects to memory bridge 105 (or, in one alternative embodiment, directly to CPU 102). In one embodiment, communication path 113 is a PCI-E link, in which dedicated lanes are allocated to each PPU 202 as is known in the art. Other communication paths may also be used. Host interface 206 generates packets (or other signals) for transmission on communication path 113 and also receives all incoming packets (or other signals) from communication path 113 and directs them to appropriate components of PPU 202. For example, commands related to processing tasks may be directed to a front end unit 212 while commands related to memory operations (e.g., reading from or writing to PP memory 204) may be directed to a memory interface 214. Host interface 206, front end unit 212, and memory interface 214 may be of generally conventional design, and a detailed description is omitted as not being critical to the present invention.

Each PPU 202 advantageously implements a highly parallel processor. As shown in detail for PPU 202(0), a PPU 202 includes a number C of cores 208, where $C \geq 1$. Each processing core 208 is capable of executing a large number (e.g., tens or hundreds) of threads concurrently, where each thread is an instance of a program; one embodiment of a multithreaded processing core 208 is described below. Cores 208 receive processing tasks to be executed via a work distribution unit 210, which receives commands defining processing tasks from a front end unit 212. Work distribution unit 210 can implement a variety of algorithms for distributing work. For instance, in one embodiment, work distribution unit 210 receives a "ready" signal from each core 208 indicating whether that core has sufficient resources to accept a new processing task. When a new processing task arrives, work distribution unit 210 assigns the task to a core 208 that is asserting the ready signal; if no core 208 is asserting the ready signal, work distribution unit 210 holds the new processing task until a ready signal is asserted by a core 208. Those skilled in the art will recognize that other algorithms may also be used and that the particular manner in which work distribution unit 210 distributes incoming processing tasks is not critical to the present invention.

Cores 208 communicate with memory interface 214 to read from or write to various external memory devices. In one embodiment, memory interface 214 includes an interface adapted to communicate with local PP memory 204, as well as a connection to host interface 206, thereby enabling the cores 208 to communicate with system memory 104 or other memory that is not local to PPU 202. Memory interface 214 can be of generally conventional design, and a detailed description is omitted.

Cores 208 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. PPUs 202 may transfer data from system memory 104 and/or local PP memories 204 into internal (on-chip) memory, process the data, and write result data back to system memory 104 and/or local PP memories 204, where such data can be accessed by other system components, including, e.g., CPU 102 or another parallel processing subsystem 112.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local PP memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs 202 may be identical or different, and each PPU 202 may have its own dedicated PP memory device(s) 204 or no dedicated PP memory device(s).

In operation, CPU 102 is the master processor of system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in FIG. 1), which may be located in system memory 104, PP memory 204, or another storage location accessible to both CPU 102 and PPU 202. PPU 202 reads the command stream from the pushbuffer and executes commands asynchronously with operation of CPU 102. Therefore, PPU 202 may be configured to offload processing form CPU 102 to increase the processing throughut and/or performance of system 100.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 202 to the rest of system 100 may also be varied. In some embodiments, PP system 112 is implemented as an add-in card that can be inserted into an expansion slot of system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

A PPU may be provided with any amount of local PP memory, including no local memory, and may use local memory and system memory in any combination. For instance, a PPU 202 can be a graphics processor in a unified memory architecture (UMA) embodiment; in such embodiments, little or no dedicated graphics (PP) memory is provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU to system memory, e.g., via a bridge chip.

As noted above, any number of PPUs 202 can be included in a parallel processing subsystem. For instance, multiple PPUs 202 can be provided on a single add-in card, or multiple add-in cards can be connected to communication path 113, or one or more of the PPUs 202 could be integrated into a bridge chip. The PPUs in a multi-PPU system may be identical to or different from each other; for instance, different PPUs might have different numbers of cores, different amounts of local PP memory, and so on. Where multiple PPUs 202 are present, they may be operated in parallel to process data at higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and so on.

Core Overview

Figure 3:
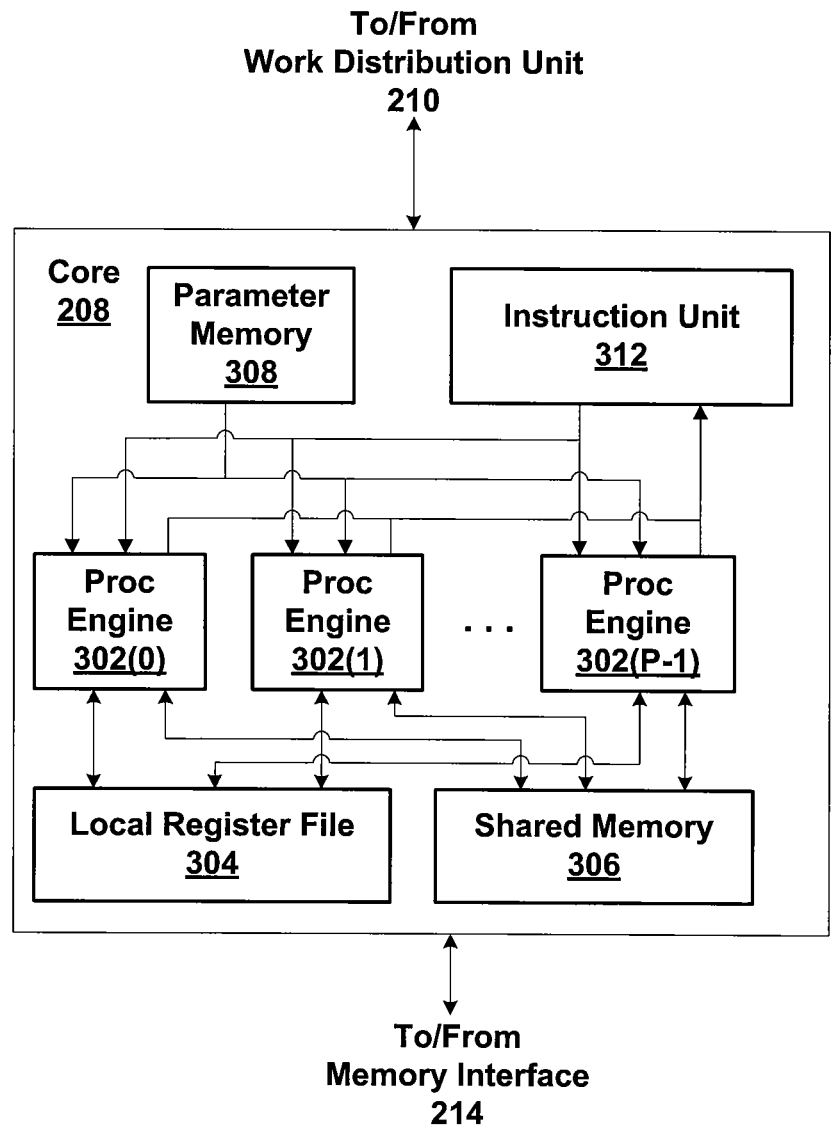
FIG. 3 is a block diagram of a core for the parallel processing subsystem of FIG. 2 in accordance with one or more aspects of the present invention.

FIG. 3 is a block diagram of a core 208 for the parallel processing subsystem 112 of FIG. 2, in accordance with one or more aspects of the present invention. PPU 202 includes a core 208 (or multiple cores 205) configured to execute a large number of threads in parallel, where the term "thread" refers to an instance of a context, i.e., a particular program executing on a particular set of input data. In some embodiments, single-instruction, multiple-data (SIMD) instruction issue techniques are used to support parallel execution of a large number of threads without providing multiple independent instruction units.

In one embodiment, each core 208 includes an array of P (e.g., 8, 16, etc.) parallel processing engines 302 configured to receive SIMD instructions from a single instruction unit 312. Each processing engine 302 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 302 uses space in a local register file (LRF) 304 for storing its local input data, intermediate results, and the like. In one embodiment, local register file 304 is physically or logically divided into P lanes, each having some number of entries (where each entry might store, e.g., a 32-bit word). One lane is assigned to each processing engine 302, and corresponding entries in different lanes can be populated with data for different threads executing the same program to facilitate SIMD execution. In some embodiments, each processing engine 302 can only access LRF entries in the lane assigned to it. The total number of entries in local register file 304 is advantageously large enough to support multiple concurrent threads per processing engine 302.

Each processing engine 302 also has access to an on-chip shared memory 306 that is shared among all of the processing engines 302 in core 208. Shared memory 306 may be as large as desired, and in some embodiments, any processing engine 302 can read to or write from any location in shared memory 306 with equally low latency (e.g., comparable to accessing local register file 304). In some embodiments, shared memory 306 is implemented as a shared register file; in other embodiments, shared memory 306 can be implemented using shared cache memory.

In addition to shared memory 306, some embodiments also provide additional on-chip parameter memory and/or cache(s) 308, which may be implemented, e.g., as a conventional RAM or cache. Parameter memory/cache 308 can be used, e.g., to hold state parameters and/or other data (e.g., various constants) that may be needed by multiple threads. Processing engines 302 also have access via memory interface 214 to off-chip "global" memory, which can include, e.g., PP memory 204 and/or system memory 104, with system memory 104 being accessible via host interface 206. It is to be understood that any memory external to PPU 202 may be used as global memory.

In one embodiment, each processing engine 302 is multithreaded and can execute up to some number G (e.g., 24) of threads concurrently, e.g., by maintaining current state information associated with each thread in a different portion of its assigned lane in local register file 304. Processing engines 302 are advantageously designed to switch rapidly from one thread to another so that instructions from different threads can be issued in any sequence without loss of efficiency. Since each thread may correspond to a different context, multiple contexts may be processed over multiple cycles as different threads are issued for each cycle.

Instruction unit 312 is configured such that, for any given processing cycle, an instruction (INSTR) is issued to each P processing engines 302. Each processing engine 302 may receive a different instruction for any given processing cycle when multiple contexts are being processed simultaneously. When all P processing engines 302 process a single context, core 208 implements a P-way SIMD microarchitecture. Since each processing engine 302 is also multithreaded, supporting up to G threads concurrently, core 208 in this embodiment can have up to P*G threads executing concurrently. For instance, if P=16 and G=24, then core 208 supports up to 384 concurrent threads for a single context or N*24 concurrent threads for each context, where N is the number of processing engines 302 allocated to the context.

Operation of core 208 is advantageously controlled via a work distribution unit 200. In some embodiments, work distribution unit 200 receives pointers to data to be processed (e.g., primitive data, vertex data, and/or pixel data) as well as locations of pushbuffers containing data or instructions defining how the data is to be processed (e.g., what program is to be executed). Work distribution unit 200 can load data to be processed into shared memory 306 and parameters into parameter memory 308. Work distribution unit 200 also initializes each new context in instruction unit 312, then signals instruction unit 312 to begin executing the context. Instruction unit 312 reads instruction pushbuffers and executes the instructions to produce processed data. When execution of a context is completed, core 208 advantageously notifies work distribution unit 200. Work distribution unit 200 can then initiate other processes, e.g., to retrieve output data from shared memory 306 and/or to prepare core 208 for execution of additional contexts.

It will be appreciated that the core architecture described herein is illustrative and that variations and modifications are possible. Any number of processing engines may be included. In some embodiments, each processing engine 302 has its own local register file, and the allocation of local register file entries per thread can be fixed or configurable as desired. In particular, entries of local register file 304 may be allocated for processing each context. Further, while only one core 208 is shown, a PPU 202 may include any number of cores 205, which are advantageously of identical design to each other so that execution behavior does not depend on which core 208 receives a particular processing task. Each core 208 advantageously operates independently of other cores 205 and has its own processing engines, shared memory, and so on.

Graphics Pipeline Architecture

Figure 4:
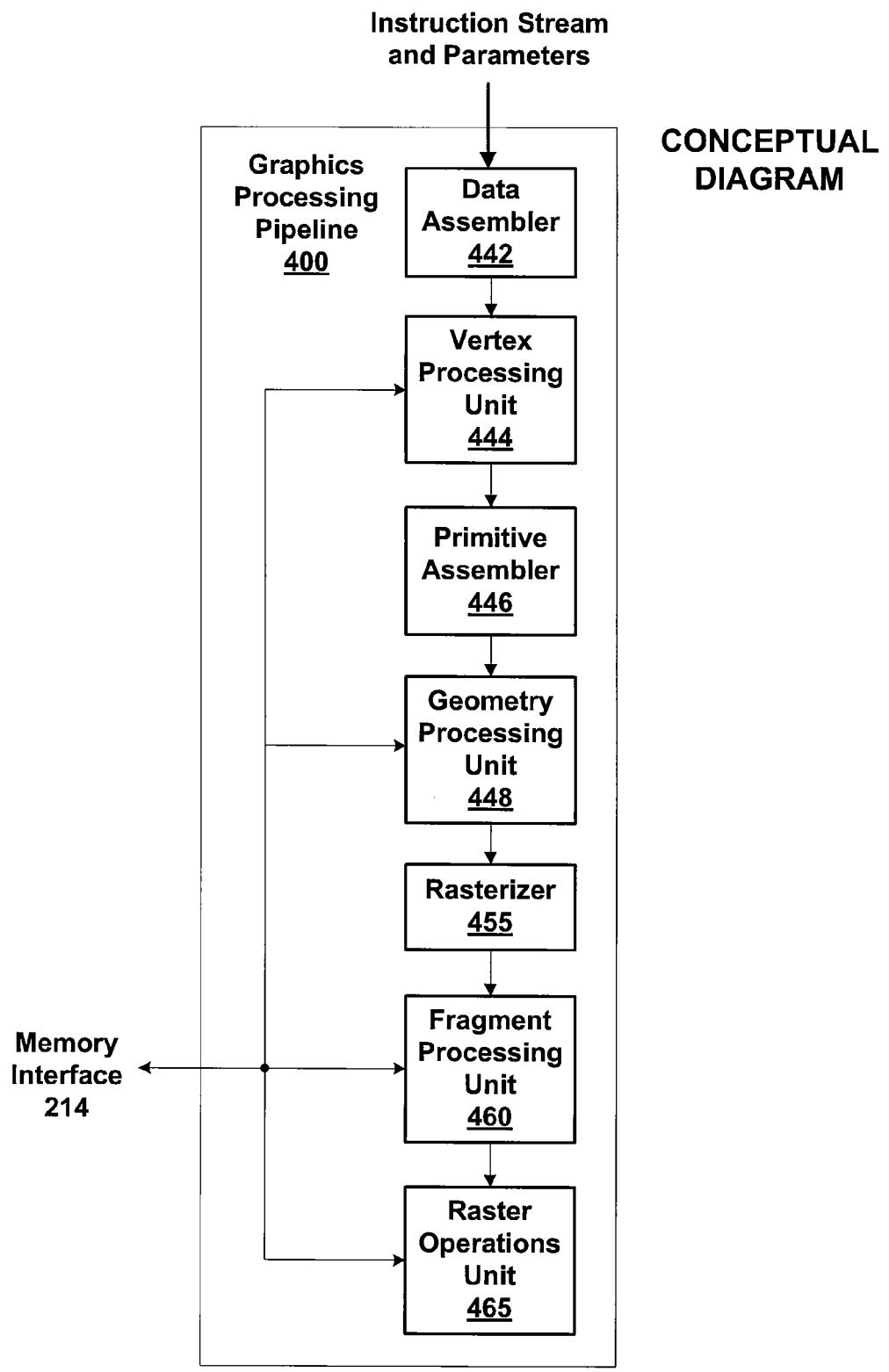
FIG. 4 is a conceptual diagram of a graphics processing pipeline in accordance with one or more aspects of the present invention.

FIG. 4 is a conceptual diagram of a graphics processing pipeline 400, in accordance with one or more aspects of the present invention. PPU 202 may be configured to form a graphics processing pipeline 400. For example, core 208 may be configured to perform the functions of a vertex processing unit 444, geometry processing unit 448, and a fragment processing unit 460. The functions of data assembler 442, primitive assembler 446, rasterizer 455, and raster operations unit 465 may also be performed by core 208 or may be performed by host interface 206.

Data assembler 442 is a fixed function unit that collects vertex data for high-order surfaces, primitives, and the like, and outputs the vertex data to vertex processing unit 444. Vertex processing unit 444 is a programmable execution unit that is configured to execute vertex shader programs, transforming vertex data as specified by the vertex shader programs. For example, vertex processing unit 444 may be programmed to transform the vertex data from an object-based coordinate representation (object space) to an alternatively based coordinate system such as world space or normalized device coordinates (NDC) space. Vertex processing unit 444 may read data that is stored in PP memory 204 or system memory 104 for use in processing the vertex data.

Primitive assembler 446 receives processed vertex data from vertex processing unit 444 and constructs graphics primitives, e.g., points, lines, triangles, or the like, for processing by geometry processing unit 448. Geometry processing unit 448 is a programmable execution unit that is configured to execute geometry shader programs, transforming graphics primitives received from primitive assembler 446 as specified by the geometry shader programs. For example, geometry processing unit 448 may be programmed to subdivide the graphics primitives into one or more new graphics primitives and calculate parameters, such as plane equation coefficients, that are used to rasterize the new graphics primitives. Geometry processing unit 448 may also add or delete elements in the geometry stream in order to execute algorithms for which the number of outputs is dynamic. In contrast with vertex processing unit 444 and fragment processing unit 460, geometry processing unit 448 is able to output variable length compressed data based on adaptive, data-dependent execution, as described in conjunction with FIGS. 5B, 6A, 6B, 7B, 8A, 8B, 8C, 9B, 9C, and 10. Geometry processing unit 448 outputs the parameters and vertices specifying new graphics primitives to rasterizer 455 or to memory interface 214. When configured to perform compression or decompression, the vertices output by geometry processing unit 448 represent compressed or decompressed data. Geometry processing unit 448 may read data that is stored in PP memory 204 or system memory 104 for use in processing the geometry data.

Rasterizer 455 scan converts the new graphics primitives and outputs fragments and coverage data to fragment processing unit 260. Fragment processing unit 460 is a programmable execution unit that is configured to execute fragment shader programs, transforming fragments received from rasterizer 455 as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in PP memory 204 or system memory 104 for use in processing the fragment data.

Memory interface 214 produces read requests for data stored in graphics memory and performs texture filtering operations, e.g., bilinear, trilinear, anisotropic, and the like. In some embodiments of the present invention, memory interface 214 may be configured to decompress data. In particular, memory interface 214 may be configured to decompress fixed length block encoded data, such as compressed data represented in a DXT format. Raster operations unit 465 is a fixed function unit that optionally performs near and far plane clipping and raster operations, such as stencil, z test, and the like, and outputs pixel data as processed graphics data for storage in graphics memory. The processed graphics data may be stored in graphics memory, e.g., PP memory 204, and/or system memory 104, for display on display device 110 or for further processing by CPU 102 or parallel processing subsystem 112.

Using the Geometry Shader for Image Processing

As previously described, a geometry shader program executed by core 208 configured as a geometry processing unit 448 can be used to accomplish some tasks that vertex shader programs and pixel (fragment) shader programs are unable to perform efficiently. Specifically, geometry processing unit 448 can be configured to compress data stored in local memory, e.g., PP memory 204, when a core 208 communicates with other devices in system 100 or within parallel processing subsystem 112. When a geometry shader program is executed, geometry processing unit 448 examines data stored in a fixed size input buffer and outputs a variable length compressed version of the input buffer. The input to the geometry shader program is a single vertex that references the input buffer as a texture map One or more vertices are produced by geometry processing unit 448 to represent the compressed version of the input buffer. When the system bandwidth is more limited than the processing resources of cores 208, computing and transferring compressed data may improve overall system performance.

A pixel shader is unable to produce adaptive variable length output for two reasons. Firstly, a pixel shader repeats the same algorithm for all of the pixels of the output buffer, and the number of pixels in the output buffer is not known in advance. Secondly, when configured as a fragment processing unit 460 that is operates on a pixel from the output buffer, core 208 has no visibility to the context of other threads that are processing other pixels (adjacent or not), so no global/ adaptive decision can be taken. Even when the number of pixels in the output buffer is known in advance, for example, when fixed size block compression is used, e.g., DXT compression, a pixel shader implementation is difficult and inefficient. Specifically, when 8 bytes represent a block, two pixels need to be written to store the compressed data. The two pixels must be computed using different pixel shader programs in order to determine the upper bytes (estimated pixel values) and lower bytes (indices) of the block.

Similarly, a vertex shader is also not very helpful for producing adaptive variable length output. For example, a compression program that is processing an input stream of data can be implemented by sending one geometry primitive (such as a flat triangle), and the vertex shader can loop over the input data and compress the input data. However, the program will have to provide exactly one triangle to rasterizer 455 to write different bytes (the compressed codes) to the output buffer. Because the vertex shader will write the same code to all of the pixels that are rasterized as part of the triangle, it is not possible to write different codes for different pixels. So, although a vertex shader can run a program that collects statistics on the input data by fetching texels, the vertex shader is only able to perform two actions, killing the primitive or forwarding the primitive to the other processing units in graphics processing pipeline 400 to write the same code for all of the pixels associated with the primitive. To be able to write n different codes to the output buffer, the vertex shader would have to receive n elements of geometry. But then n vertex shader programs would run, all doing the same thing and unable to make any adaptive decisions because they run in separate threads, isolated from each other.

In contrast, a geometry shader executed by a core 208 that is configured as a geometry processing unit 448 is able to output variable length results based on adaptive, data-dependent execution. In a single pass, the geometry shader can analyze input data (for example, the contents of a texture) and output one or more variable length stream of vertices representing the compressed data (many vertices can be emitted by a single geometry shader execution thread). It is possible to output variable length results by executing a geometry shader by providing a single vertex to the geometry shader or by providing a vertex for each region of an input image, as described in conjunction with FIG. 8A. Alternatively, multiple vertices may be input to execute the geometry shader in parallel and produce multiple variable length streams of vertices, as described in conjunction with FIG. 8B. When some input data is passed in as static program parameters, e.g. as color for a Cg program, this vertex is processed in a single execution thread. The single thread can build statistics, fetch as many texels as needed, perform math operations, plus write a variable length output by emitting an adaptive number of scalars.

Figure 5A:
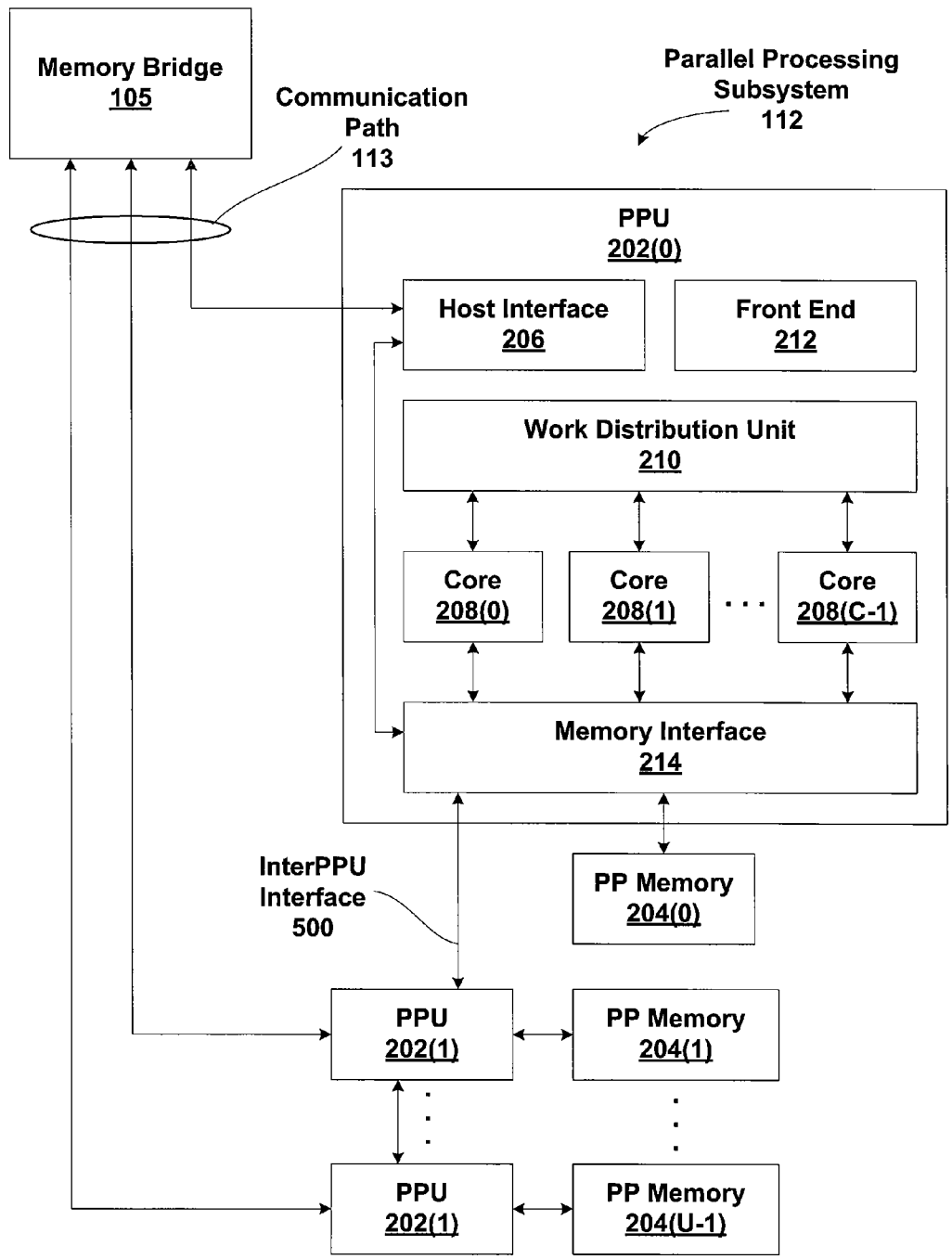
FIG. 5A is another block diagram of a parallel processing subsystem for the computer system of FIG. 1 in accordance with one or more aspects of the present invention.

FIG. 5A is another block diagram of a parallel processing subsystem 112 for computer system 100 of FIG. 1, in accordance with one or more aspects of the present invention. In this embodiment, parallel processing subsystem 112 includes an interPPU interface 500 that provides a direct connection between PPUs 202, so that data and commands may be transferred between the PPUs 202 without passing though memory bridge 105.

Figure 5B:
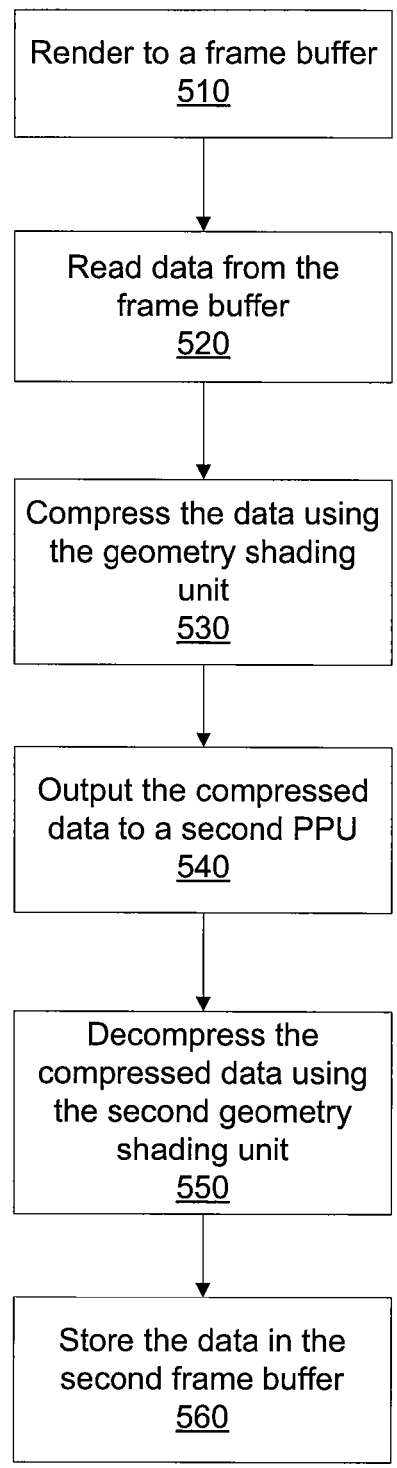
FIG. 5B is a flow diagram of method steps for executing a geometry shader program to compress data and transfer the compressed data between PPUs in accordance with one or more aspects of the present invention.

FIG. 5B is a flow diagram of method steps for executing a geometry shader program to compress data and transfer the compressed data between PPUs 202, in accordance with one or more aspects of the present invention. The compressed data may be transferred between the PPUs 202 through memory bridge 105 or interPPU interface 500. In step 510 a first PPU 202 processes input data to render an image that is stored in a frame buffer within a first PP memory 204. In step 520, a core 208 configured as a geometry processing unit reads the image stored in the frame buffer. In step 530 the core 208 executes a geometry shading program to compress the image data. Although the invention is described in a graphics context, it is not limited to the processing of image data. Other types of data may be processed (compressed or decompressed) using the techniques described herein.

In step 540 the core 208 outputs the compressed data to a second PPU 202 through memory bridge 105 or interPPU interface 500. The compressed data may be written to a output buffer in the first PP memory 204 before being transferred to the second PPU 202. In step 550 the second PPU 202 decompresses the compressed data using one or more cores 208 configured as geometry shading units. In step 560 the second PPU 202 stores the decompressed data in the second frame buffer.

Alternatively, the second PPU 202 may be configured to store the compressed data in a frame buffer in a second PP memory 204 that is coupled to the second PPU 202 and decompress the compressed data when it is read from PP memory 204. A benefit of compressing the data before transferring the data from the first PPU 202 to the second PPU 202 is that less bandwidth is needed to copy the data. In particular, when many devices compete for the bandwidth provided through memory bridge 105, reducing the bandwidth needed for interPPU transfers may improve overall system performance. In systems that include interPPU interface 500, the bandwidth capability of interPPU interface 500 may be reduced in order to save system cost when interPPU transfers include compressed data instead of uncompressed data. Similarly, it is desirable to transfer compressed data from parallel processing subsystem 112 to CPU 102 and remote targets, within system 100, e.g., system disk 114, network adapter 118, add-in card 120, and add-in card 121, and outside of system 100, in order to reduce system and/or network bandwidth.

Figure 6A:
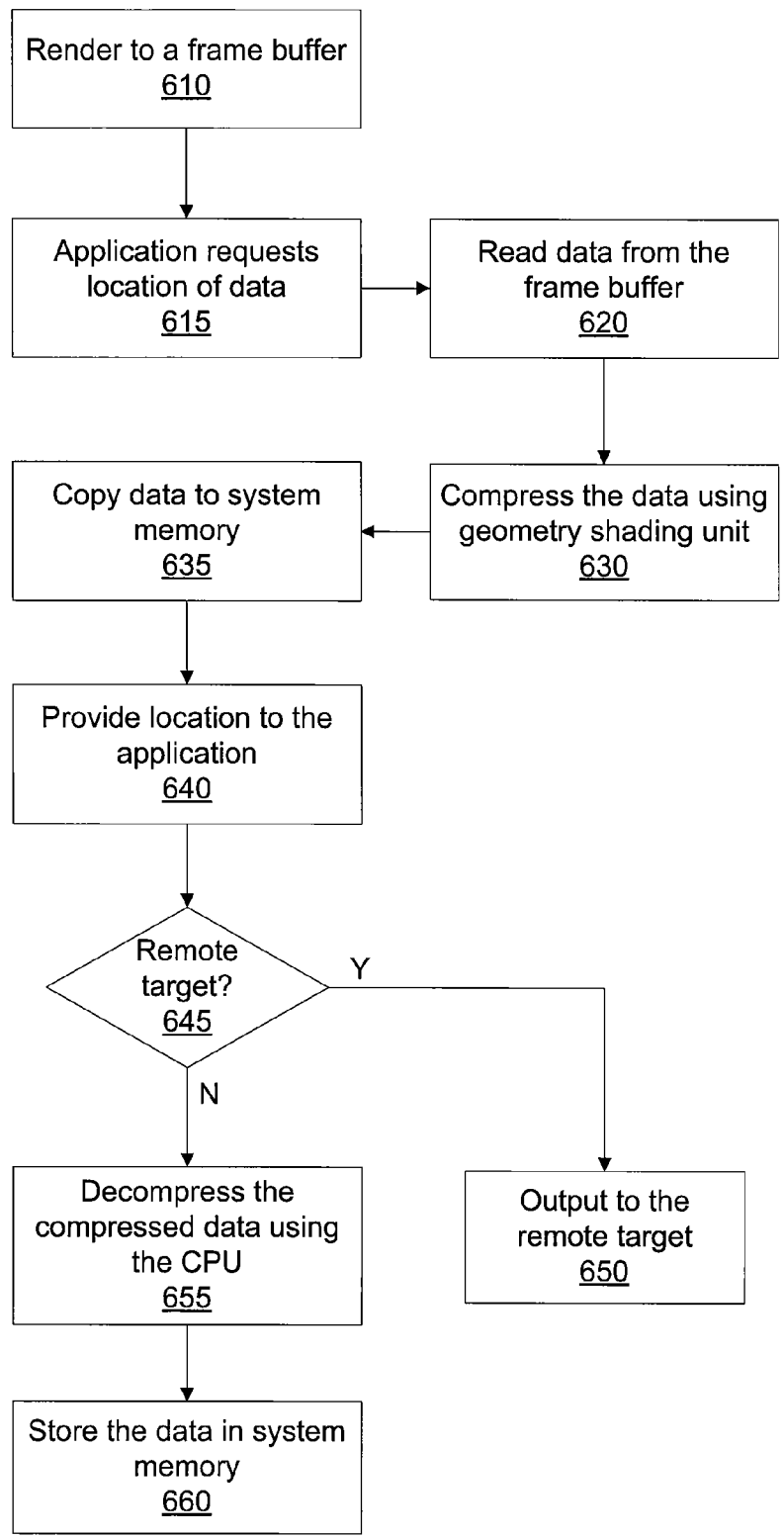
FIG. 6A is a flow diagram of method steps for executing a geometry shader program to compress data and transfer the compressed data to a CPU or remote target in accordance with one or more aspects of the present invention.

FIG. 6A is a flow diagram of method steps for executing a geometry shader program to compress data and transfer the compressed data to CPU 102 or a remote target via I/O bridge 107, in accordance with one or more aspects of the present invention. In step 610 a PPU 202 processes input data to render an image that is stored in a frame buffer within a PP memory 204. In step 615 an application program running on CPU 102 requests the location of the rendered image in order to access the rendered image. The application program may be used to capture the rendered image or desktop and output the rendered image over a network for video conferencing or other remote data operations.

In step 620, one or more cores 208 configured as geometry processing units read the image stored in the frame buffer. In step 630 the cores 208 execute a geometry shading program to compress the image data. In step 635 the cores 208 output the compressed data to system memory 104 through memory bridge 105. When writing from PPUs 202 to system memory 104 is faster than reading PPU memory 204 by CPU 102, transfer of the compressed data is best accomplished by having PPUs 202 write the compressed data to system memory 104. The compressed data may be written to a output buffer in PP memory 204 before being transferred to system memory 104. In step 640 the location of the compressed data in system memory 104 is provided to the application.

In step 645 the application determines if the data will be transmitted to a remote target through I/O bridge 107, and, if so, in step 650 the comrpessed data is output to the remote target. If, in step 645 the application program determines that the data will not be transmitted to a remote target, then in step 655 the compressed data is decompressed using CPU 102. In step 660 the decompressed data is stored in system memory 104. Alternatively, the compressed data may be decompressed on-the-fly when it is read by the application.

When Microsoft's Vista operating system is used in system 100, data stored in PPU memories 204 may be copied to another storage device, e.g., system memory 104, system disk 114, or the like, to make room for data needed by an executing application program. In order to reduce the time needed to copy the data, the data may be compressed by a PPU 204. Additionally, the compressed data occupies a smaller memory footprint in system memory 104. Therefore, memory bandwidth and memory storage are both reduced by compressing the data. Importantly, the compression performed by PPU 204 is lossless so that the compressed data can be restored exactly when it is decompressed.

Figure 6B:
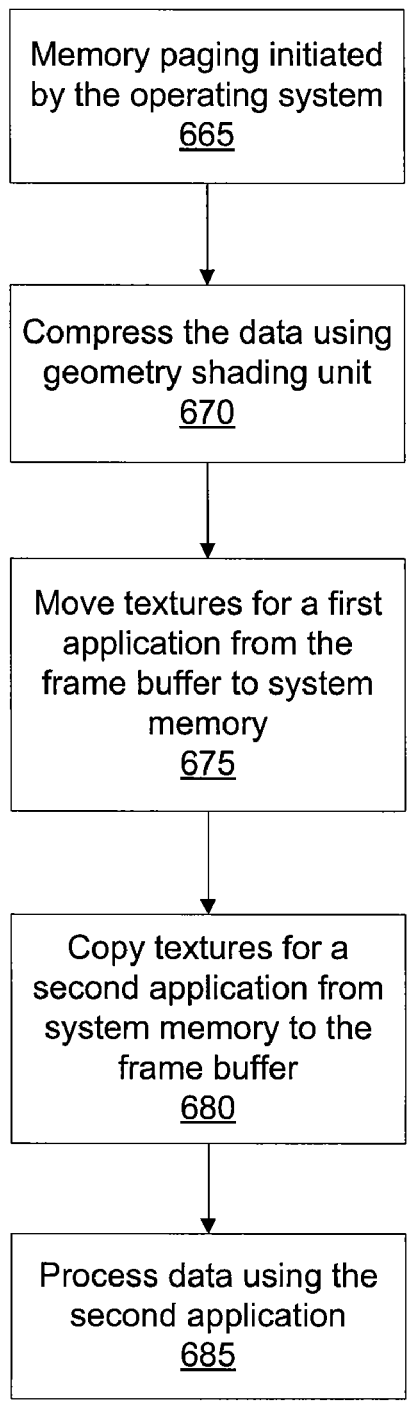
FIG. 6B is a flow diagram of method steps for executing a geometry shader program to compress data when memory paging is used in accordance with one or more aspects of the present invention.

FIG. 6B is a flow diagram of method steps for executing a geometry shader program to compress data when memory paging is used, in accordance with one or more aspects of the present invention. In step 665 the operating system initiates memory paging. In step 670 a PPU 204 is configured to compress texture maps or other data used by a first application by executing a geometry shading program. In step 675 the compressed data used by a first application program are moved from a frame buffer in PPU memory 204 to system memory 104. In step 680 texture maps or other data used by a second application program are copied from system memory 104 to the frame buffer in PPU memory 204 to complete the memory paging operation initiated in step 665. In step 684 the second application processes the data stored in the frame buffer.

In some embodiments of system 100, memory bridge 105 is configured to access a portion of the virtual memory space, i.e, aperture, within parallel processing subsystem 112. The aperture may be 256 Mbytes of a 512 Mbyte physical memory. The virtual addresses are translated into physical addresses to read and write PP memories 204 using techniques known to those skilled in the art. Device driver 103 may be configured to provide an application program with the physical address corresponding to a virtual address to be read from or written to.

Figure 7A:
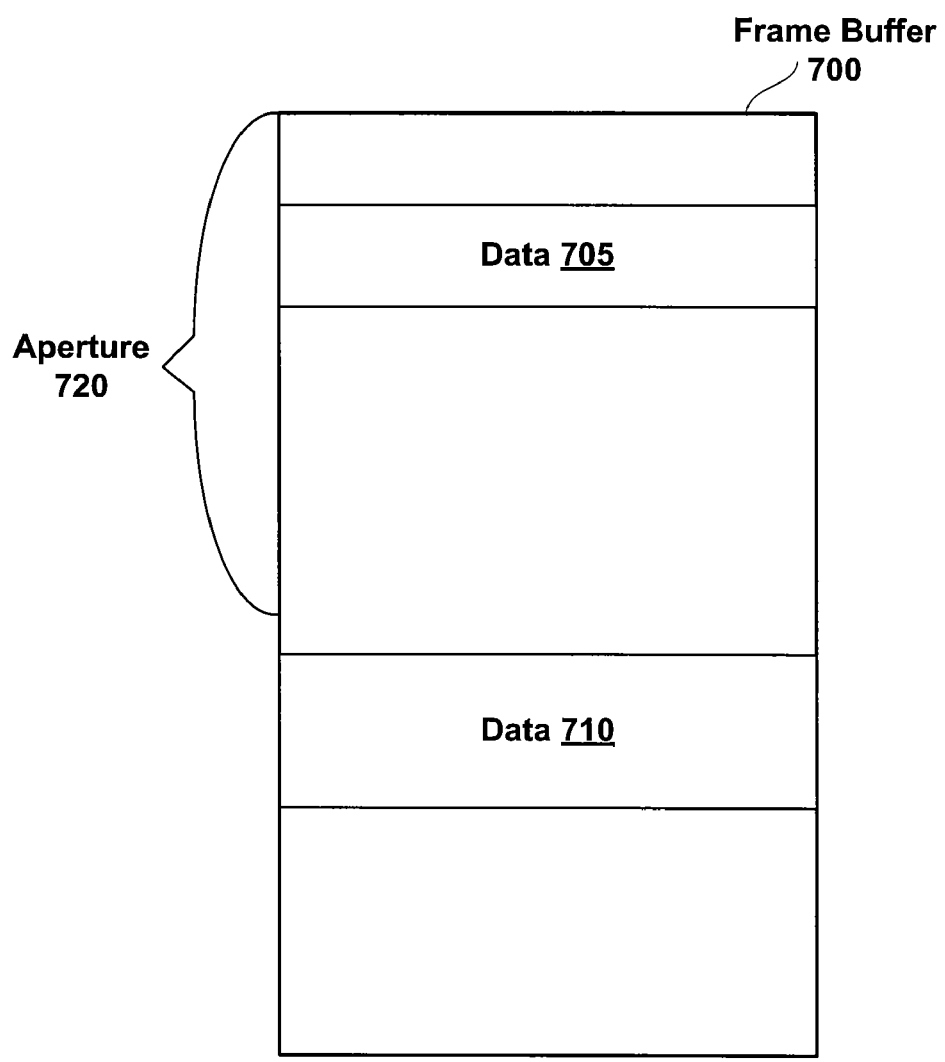
FIG. 7A is a diagram of a frame buffer with data stored inside and outside of an aperture in accordance with one or more aspects of the present invention.

FIG. 7A is a diagram of a frame buffer 700 with data stored inside and outside of an aperture 720, in accordance with one or more aspects of the present invention. When an application program reads or writes data 710 that is outside of aperture 720, data 710 is copied by device driver 103 to a location that lies within aperture 720. When the application program reads or write data 705, the copy is not needed since data 705 lies within aperture 720. In conventional systems the bandwidth available to perform the copy operation is 50 Mbytes/sec which is too slow to provide 1600×1200 pixel image data at 60 Hz for screen updates. A bandwidth of 115.2 Mbytes/sec is needed for screen updates. To overcome the bandwidth limitation and allow the application program access to the image data, the data lying outside of aperture 720, is compressed and copied to system memory 104. The application program can typically access system memory 104 at a rate of 60 Gbytes/sec the available bandwidth between parallel processing subsystem 112 and memory bridge 105 is 4.5 Gbytes/sec for PCI express 8×, both of which are sufficient to provide a display update rate of 60 Hz.

Figure 7B:
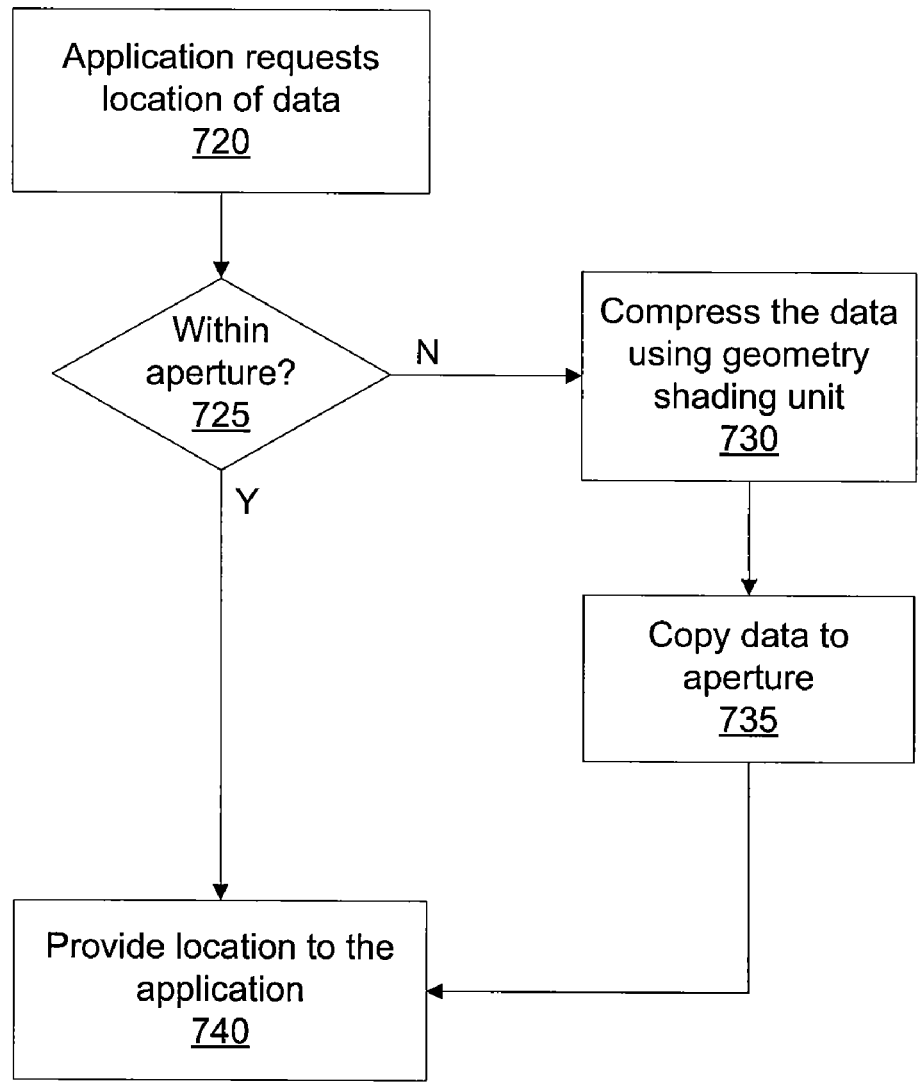
FIG. 7B is a flow diagram of method steps for executing a geometry shader program to copy data that is outside of the aperture to locations within the aperture in accordance with one or more aspects of the present invention.

FIG. 7B is a flow diagram of method steps for executing a geometry shader program to copy data that is outside of aperture 720 to locations within aperture 720, in accordance with one or more aspects of the present invention. In step 720 the application program requests the location of data in PP memory 204. In step 725 device driver 103 determines if the virtual address provided by the application program corresponds to a physical address that lies within aperture 720, and, if so, in step 740 device driver 103 provides the physical address to the application program. Otherwise, in step 730 device driver 103 configures one or more PPUs 202 to operate as geometry shading units to compress the data. In step 735 the one or more PPUs 202 write the compressed data to locations in frame buffer 700 that lie within aperture 720, effectively copying the data to aperture 720. In step 730, device driver 103 provides the physical address of the compressed data to the application program. In some embodiments of the present invention, data that lies within aperture 720 is also compressed in order to reduce the bandwidth needed to provide that data to the application program and to reduce the memory footprint of that data.

Figure 8A:
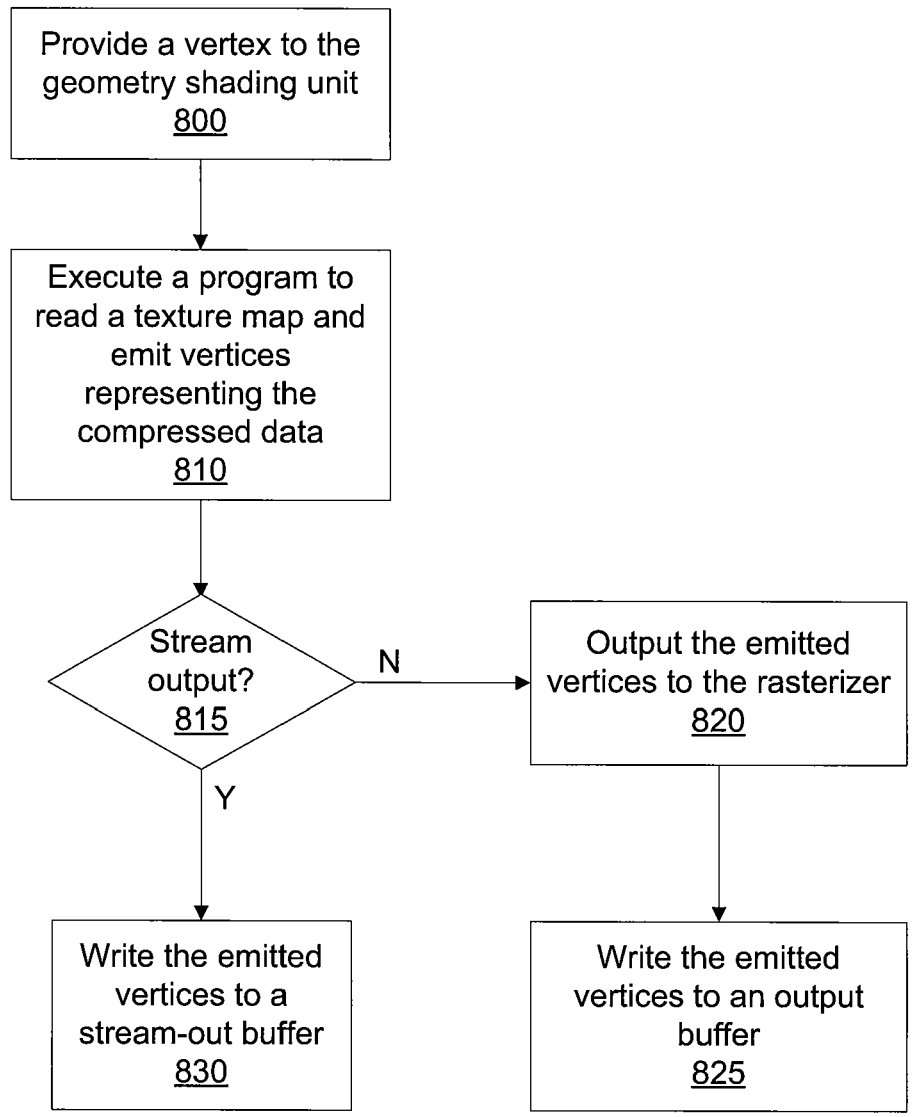
FIG. 8A is a flow diagram of method steps for executing a geometry shader program to compress data and write the compressed data to an output buffer in accordance with one or more aspects of the present invention.

FIG. 8A is a flow diagram of method steps for executing a geometry shader program to compress data and write the compressed data to an output buffer, in accordance with one or more aspects of the present invention. An output array is allocated in memory to store the variable length compressed data. In step 800 device driver provides a vertex to a core 208 that is configured as a geometry shading unit. A single vertex may be used to trigger the execution of a geometry shader program that produces an number of vertices that are written to an output buffer. Arguments to the compression program may be advantageously passed as the vertex coordindates. For example, the length of the data to be compressed may be encoded into the position of the vertex. In step 810 the core 208 executes a geometry shader program to read a texture map containing the data to be compressed and conditionally emit vertices at any rate. The vertices include computed positions that represent the compressed data, as described in conjunction with FIG. 8C.

A core 208 configured as geometry processing unit 448 can write results produced during execution of a geometry shader in two different ways, through raster operations unit 465 or directly to a stream-out buffer. A stream-out buffer is a DX10 feature that redirects the output of the geometry processing unit 448 into a one dimensional buffer rather than to rasterizer 455. In step 815 core 208 determines if stream-out output is specified, and, if not, in step 820 vertices emitted by core 208 are output to raster operations unit 465. The method then proceeds to step 825 and writes the vertex values at locations in the output buffer, e.g., PP memory 204 or system memory 104 through raster operations unit 465.

The "position" and "color" of these emitted vertices that are computed by the geometry shader program are scalar values that are output. The compressed data may be packed into a 32 bit integer in the fields ordinarily used for z and w coordinates of the position. Therefore, only the position of the vertex is emitted which has the location (x, y) and the compressed data. The x and y coordinates of the vertices tell raster operations unit 465 where to write the scalars that are stored in the color field. The x coordinate is incremented each time the geometry shader emits values to be written to the output buffer.

In order to compress the data, the vertices emitted by the geometry shader should be unmodified by the transform and clipping unit, so the model/view transforms are set to "identity," with no filtering, pixel fragment processing unit 460 usage, or lighting effects allowed. In some embodiments of the present invention, the trigger for the geometry shader program is a simple OpenGL program, which needs some special setup to configure the pixel shader as a pass through unit. The values that are passed into the program as colors are just full-range floating-point numbers, as shown in TABLE 1.

TABLE 1 glClampColorARB(GL_CLAMP_VERTEX_COLOR_ARB, FALSE);
glClampColorARB(GL_CLAMP_FRAMENT_COLOR_ARB, FALSE);
glClampColorARB(GL_CLAMP_READ_COLOR_ARB, FALSE);

If, in step 815 core 208 determines that stream-out output is specified, then core 208 proceeds directly to step 830, bypassing raster operations unit 465, to emit scalars that are incrementally added to a stream-out buffer. When the stream-out feature of DX-compliant hardware is used for output, the geometry shader program does not have to track the two dimensional location (x,y) of the pixels being output. The stream-out feature is compact because it does not use the "location" components to write a linear buffer. However, when multiple vertices are processed in parallel to perform compression, each execution thread should have a different stream-out buffer since the threads execute in parallel.

When a stream-out buffer is stored at a two dimensional position in the frame buffer, it can be readily used as an input texture to the next processing state, which is useful when implementing on-the-fly texture compression. When the compressed data is written to system memory 102, a PPU 202 can retrieve the compressed data, advantageously reading full cache lines with sector promotion for increased efficiency. When the compressed data is written by a first PPU 202 into a PPU memory 204 of a second PPU 202, the second PPU 202 can be programmed to uncompress the compressed data when it is read from the PPU memory 204. Writing compressed data directly to another PPU memory 204 or system memory 104 is preferred since no intervention by CPU 102 is needed to transfer the compressed data.

As shown in FIG. 8A, it is possible to send only one vertex to produce a geometry shader execution thread that can read the entire input image and output the compressed data in one pass through core 208. However, core 208 is inherently parallel, so performance is increased if the geometry shader program is executed on several geometry shader threads, with each thread working on a portion of the input image. This technique is easily performed by sending several vertices to trigger more geometry shader threads, as described in conjunction with FIG. 8B.

Figure 8B:
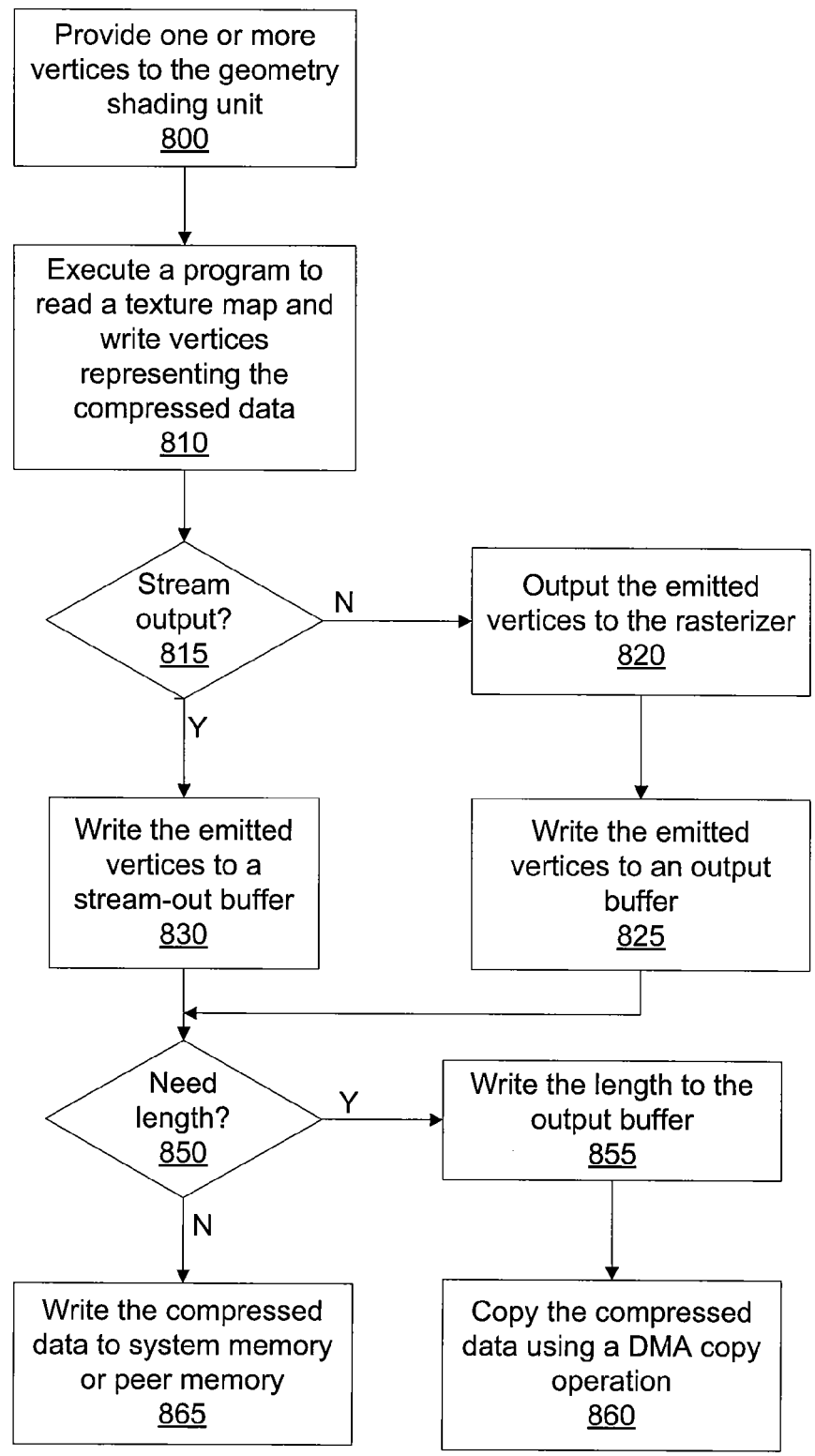
FIG. 8B is a flow diagram of method steps for executing a geometry shader program to compress data and store the data in system memory or peer memory in accordance with one or more aspects of the present invention.

FIG. 8B is a flow diagram of method steps for executing a geometry shader program to compress data and store the data in system memory 104 or peer memory, e.g., PP memory 204, in accordance with one or more aspects of the present invention. In step 801 device driver 103 provides one or more vertices to one or more cores 208 that are configured as geometry shading units. Rather than using a single vertex as in step 800, multiple vertices may be used to subdivide the compression task and perform compression of the data in parallel using more than one core 208. For example, a vertex may be provided for each scanline of an input image to compress each scanline in parallel.

Figure 8C:
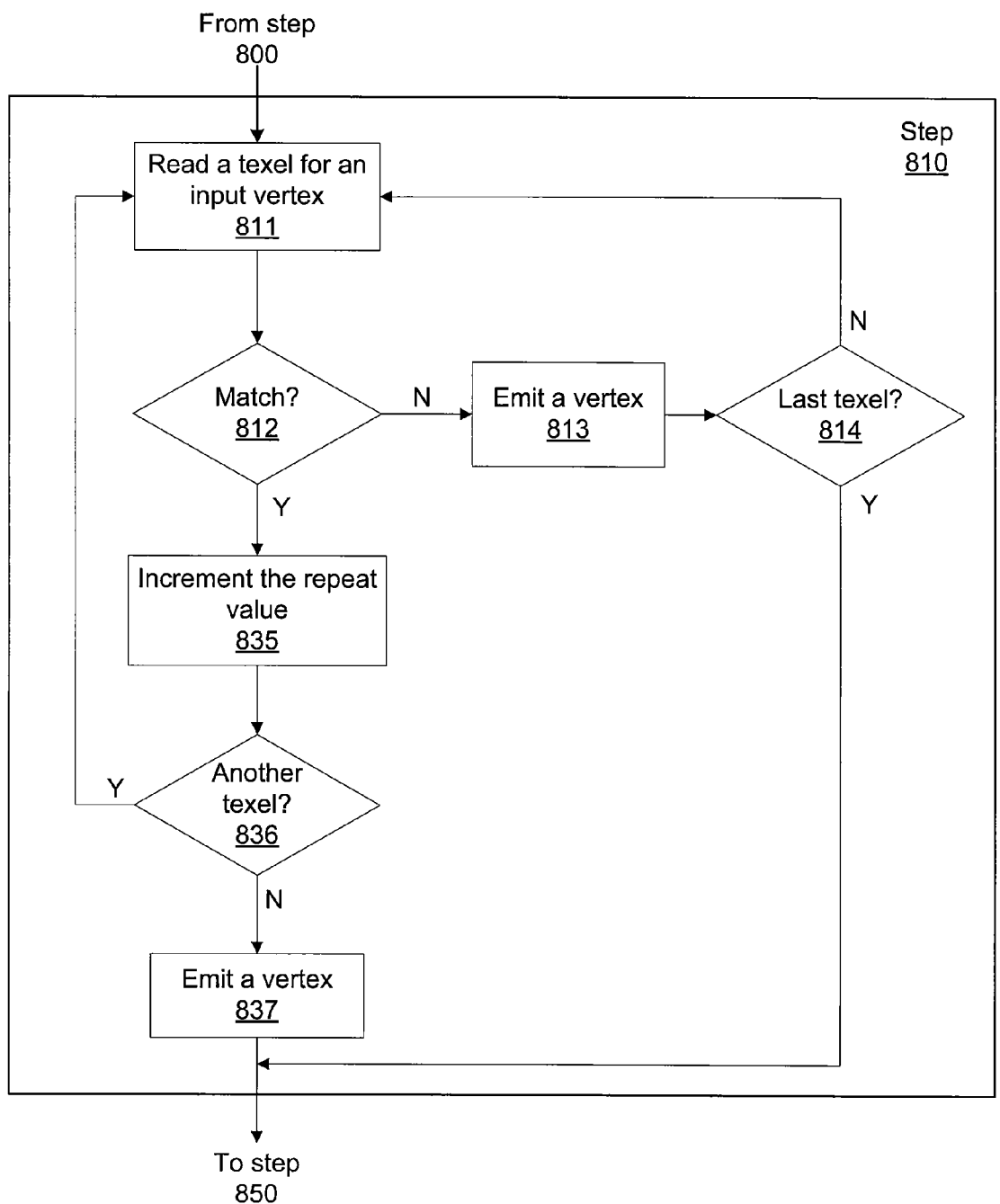
FIG. 8C is a flow diagram of a step shown in FIGS. 8A and 8B in accordance with one or more aspects of the present invention.

Step 810 is completed is described in detail in conjunction with FIG. 8C. Steps 815, 820, 825, and 830 are completed as described in conjunction with FIG. 8A in order to write the compressed data to an output buffer or stream-out buffer. When two PPUs 202 are working together with a first PPU 202 compressing data and a second PPU 202 decompressing the data, then the length of the compressed data does not need to be provided to the second PPU 202. In some other cases, such as when PPU 202 cannot write to system memory 104, the length of the compressed data is needed in order for an application program to know how many bytes of compressed data to copy from PP memory 204 to system memory 104.

In step 850 core 208 determines if the length (quantity) of compressed data that is stored in the output or stream-out buffer is needed, and, if so, in step 855 raster operations unit 465 writes the quantity to a predetermined location in the output or stream-out buffer. Device driver 103 retrieves the quantity of the compressed data and sends a DMA transfer command to PPU 202 to copy the compressed data from PP Memory 204 to system memory 104. Device driver 103 can read the length from a known position in the output or stream-out buffer, such as the first scalar written at the end of the geometry shader thread (when the exact number of emitted codes is known). Alternatively, CPU 102 can retrieve the length through an occlusion query and in step 860 CPU 102 copies the compressed data to system memory 104 using a DMA (direct memory access) copy operation.

If, in step 850 core 208 determines that the quantity of data is not needed, then in step 865 core 208 writes the compressed data to system memory 104 or PPU memory 204 rather than copying the compressed data.

FIG. 8C is a flow diagram of step 810 that is shown in FIGS. 8A and 8B, in accordance with one or more aspects of the present invention. In step 810 conventional run length encoding is used to compress the data, producing a variable length output. In the worst case, when each data value in a stream varies from the previous data value, run length encoding can bloat the data. In order to avoid producing compressed data that is larger than the input data, the repeat value is the number of times a data value is repeated in a stream. The repeat value is stored in the alpha channel of the compressed data. Therefore, in the worst case, the size of the compressed data is equal to the size of the input data.

In step 811a texel of the data to be compressed is read using an input vertex that is provided to one of the cores 208 that is configured as a geometry shading units. Note that when multiple input vertices are used, each of the cores 208 is configured to perform step 811 in parallel for different input vertices to improve processing throughput compared with using a single vertex. In step 812 the core 208 determines if the texel matches the previous texel. For example, when each texel stores a color, each of the color components is compared for the texel at position (x,y) with the corresponding color component of the previous texel at position (x−1, y) to determine whether or not the new texel matches the previous texel. When a texel is the first texel, it is considered to match the "previous" texel, and is used as the previous texel for subsequent texel comparisons. The graphics shader program fetches all of the texels that are on a scanline when each input vertex corresponds to a scanline of a texture map. An output buffer is allocated that is the same size as the texture map and the compressed vertices for a scanline of the texture map are stored in the corresponding scanline of the output buffer. The quantity of vertices that are stored in each scanline may be stored in the alpha channel of the first vertex of each scanline.

If, in step 812 the new texel matches the previous texel, in step 835 the repeat value is incremented. The repeat value is initialized as zero and is incremented for each matching texel. An output vertex includes the previous texel data value and the repeat value to produce a run length encoded stream of vertices representing the compressed data. In step 836 the core 208 determines if another texel is specified for the input vertex, and, if so, then core 208 returns to step 811. Otherwise, in step 837 core 208 emits a vertex including the previous texel and the repeat value and the compression operation is complete for the input vertex. In some embodiments the length has a maximum value due to the number of bits in the field in which it is stored. In those embodiments, a vertex is emitted when the maximum is reached and the repeat value is reset to form a new vertex even though the texels matched.

If, in step 812 the new texel does not match the previous texel, then in step 813 core 208 emits a vertex including the previous texel and the repeat value. In step 814 core 208 determines if the new texel is the last texel specified for the input vertex, and, if not, then core 208 returns to step 811. Otherwise, the compression operation for the input vertex is complete and core 208 proceeds to step 850. As previously described, the quantity of vertices emitted for a scanline may be stored in the first alpha field for the scanline.

FIG. 9A is an output buffer storing sparse compressed data 900, in accordance with one or more aspects of the present invention. Each scanline of a texture map is compressed and vertices are emitted to produce sparse compressed data 900. Vertices 910, 911, and 912 are produced for a first scanline. Vertices 920, 921, 922, 923, 924, and 925 are produced for a second scanline. Vertices 930, 931, 932, 933, 934, 935, 936, and 937 are produced for a third scanline. Finally, vertices 940 and 941 are produced for a fourth scanline. Note that the vertices emitted for each scanline are packed at the beginning of each scanline and the number of vertices emitted for each scanline varies. However, the buffer storing sparse compressed data 900 is sized to accommodate the worstcase compression. Therefore, the footprint of sparse compressed data 900 may be reduced by packing the compressed data.

Figure 9B:
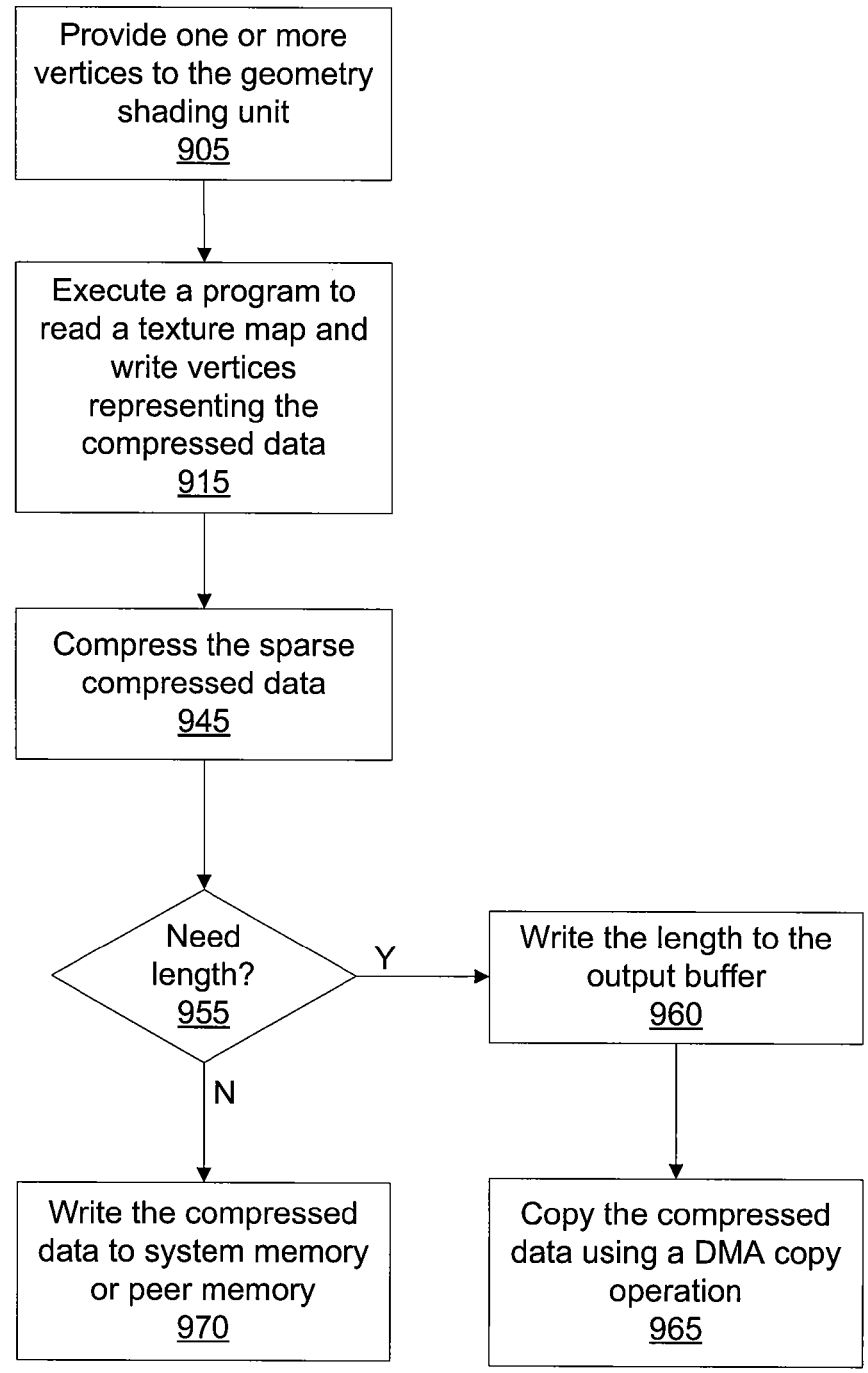
FIG. 9B is a flow diagram of method steps for executing a geometry shader program in parallel to compress data and write the compressed data to an output buffer in accordance with one or more aspects of the present invention.

FIG. 9B is a flow diagram of method steps for executing a geometry shader program in parallel to compress data and write the compressed data to an output buffer in a first pass and pack the sparse compressed data in a second pass, in accordance with one or more aspects of the present invention. In step 905 one or more vertices are provided to one or more cores 208 that are each configured as geometry shading units. In step 915 the one or more cores 208 execute a first geometry shading program to read a texture map and write vertices representing the compressed data. As previously described the compressed data may be represented by run length encoded scalar values, i.e., a data value and repeat value pair. In step 945 a second geometry shading program is executed by a core 208 to pack the sparse compressed data, as described in detail in conjunction with FIG. 9C. Steps 955, 960, 970, and 965 correspond to previously described steps 850, 855, 860, and 865, respectively.

The second geometry shading program configures the core 208 and rasterizer 455 as a copy engine that copies portions of the compressed data from one location to another in another output buffer to produce packed compressed data, such as compressed data 950 shown in FIG. 9D. The first geometry shading program and the second geometry shading program can be combined into a single program with two subroutines. The subroutine to be executed can be sent into one component of the geometry elements (vertices) that are provided to cores 208. For example, vertex.z==1 can be used to execute the first subroutine and vertex.z==2 can be used to execute the second subroutine. Therefore, it is straightforward to switch between the different subroutines.

Figure 9C:
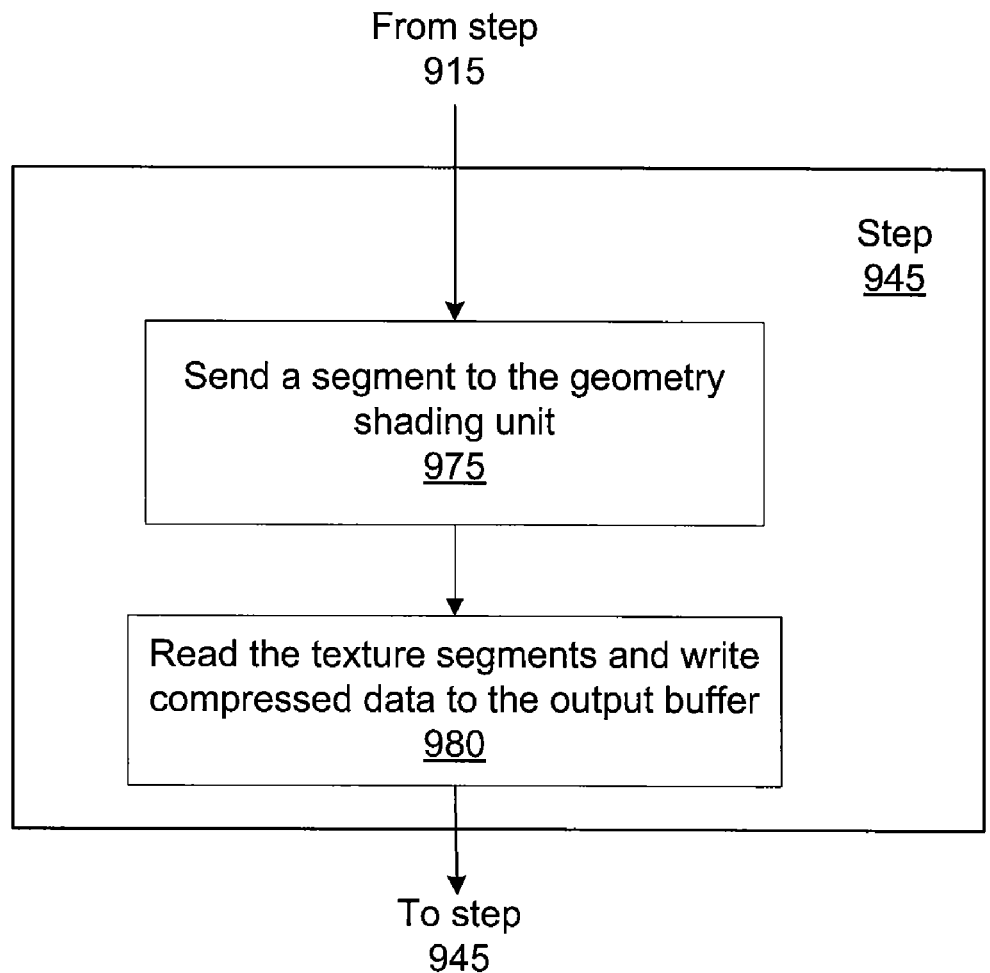
FIG. 9C is a flow diagram of a step shown in FIG. 9B in accordance with one or more aspects of the present invention.

FIG. 9C is a flow diagram of a step shown in FIG. 9B, in accordance with one or more aspects of the present invention. In step 975 a line primitive, e.g., segment, is provided to a core 208 that is configured as a geometry processing unit. In step 980 the core 208 reads the texture segment for each scanline of sparse compressed data 900 shown in FIG. 9A and writes the texture segments into a different output buffer to produce packed compressed data 950 shown in FIG. 9D.

The second geometry shading program transforms the vertex position to compute a new position that the compressed data is copied to and reads the compressed data using the (u,v)

texture coordinates to perform a 1:1 copy of the texels that specify the compressed data. A vertex shader program may be used to perform a copy, but it is advantageous to use a geoemtry shading program to handle line breaks. For example, a segment of compressed data in the source texture map may need to be broken into two desination lines in the target texture map when the destination segment straddles the border of the target texture map.

FIG. 9D is an output buffer storing packed compressed data 950, in accordance with one or more aspects of the present invention. Sparse compressed data 900 from multiple scanlines as shown in FIG. 9A is packed into fewer scanlines to produce packed compressed data 950. For example, vertices 920, 921, 922, 923, 924, 925, 930, 931, and 932 are packed in the first scanline with vertices 910, 911, and 912. The second geometry shader program inserted a break between vertices 932 and 933 since the texture map boundary was crossed and then wrote vertices 933, 934, 935, 936, 937, 940, and 941 to the second scanline. Note that a geometry shading program may also be used to compact sparse results of other algorithms, such as matrices and the like.

Figure 10:
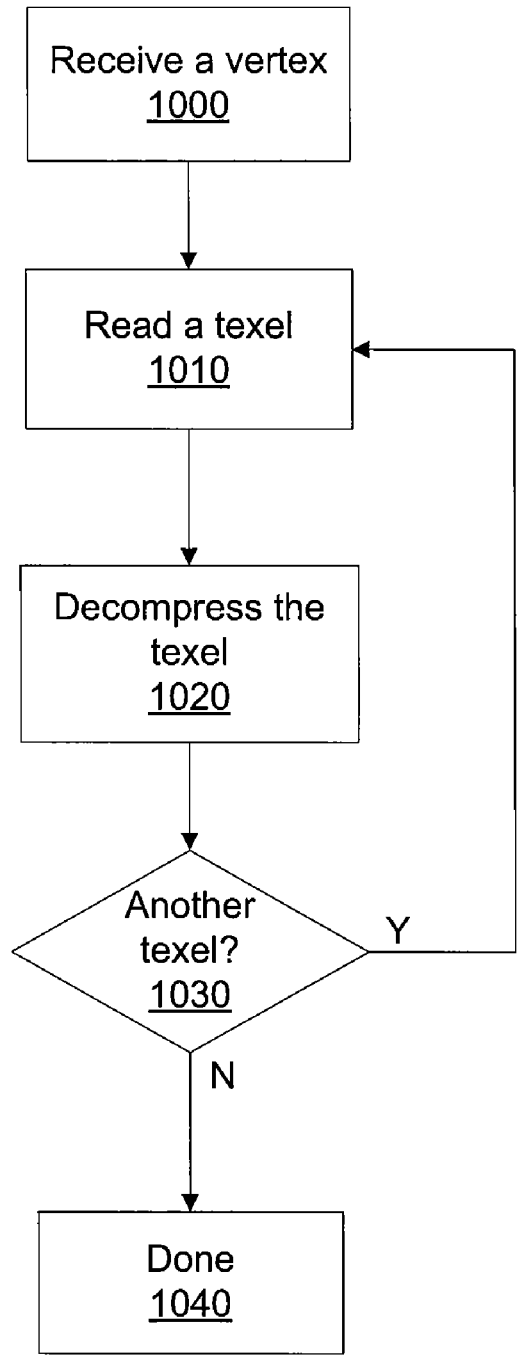
FIG. 10 is a flow diagram of method steps for decompressing the compressed data produced using a geometry shader program in accordance with one or more aspects of the present invention.

FIG. 10 is a flow diagram of method steps for decompressing the compressed data produced using a geometry shader program, in accordance with one or more aspects of the present invention. The method steps may be executed by a core 208 configured as a geometry shading unit or by CPU 102 to restore the losslessly compressed data. In step 1000 a core 208 receives a vertex corresponding to the compressed data. In step 1010 the core 208 reads a texel from the source texture map that represents the compressed data. In step 1020 the core 208 decompresses the texel by replicating the value (color) according to the repeat value when the data is compressed using run length encoding. In step 1030 core 208 determines if another texel should be decompressed, and, if so, core 208 returns to step 1010 and reads the next texel from the source texture map. As previously described, the number of vertices specifying the compressed data may be stored in the first vertex of the compressed data. If, in step 1030 core 208 determines that there is not another texel to be decompressed, then in step 1040 the decompression is complete and the data is restored.

Parallel processing subsystem 112 may be configured to losslessly compress data stored in PP memories 204 when parallel processing subsystem 112 transfers the data to another device in system 100 in order to reduce the bandwidth needed to transfer the data and/or the amount of memory needed to store the data. Additionally, a PPU 202 within parallel processing subsystem 112 may be configured to losslessly compress data before transferring that data to another PPU 22 within parallel processing subsystem 112. The compressed data may be decompressed to restore the original data by a PPU 202, CPU 102, or a remote target that is configured to received the compressed data. Data may be compressed in order to support memory paging operations and to access data stored outside of a memory aperture. One or more cores 208 within PPUs 202 are configured by a geometry shader program to perform the compression or decompression in order to produce a stream of variable length output data. A geometry shader program may also be used to perform 1:1 texture mapping and pack a sparse texture map to reduce the memory needed to store that that texture map.

The invention has been described above with reference to specific embodiments. Persons skilled in the art, however, will understand that various modifications and changes may be made thereto without departing from the broader spirit and scope of the invention as set forth in the appended claims. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. The foregoing description and drawings are, accordingly, to be regarded in an illustrative rather than a restrictive sense.

The invention claimed is:

1. A method for using a geometry shader unit to decompress variable length compressed data and restore the data, comprising:
   receiving a single input vertex that specifies the variable length compressed data of a first length;
   reading the variable length compressed data;
   decompressing the variable length compressed data using the geometry shader unit to produce the data of a second length, wherein the second length is greater than the first length;
   rasterizing the data of the second length to generate fragments; and
   transforming the fragments using a fragment processing unit to produce shaded fragments.

2. The method of claim 1, further comprising the steps of:
   extracting a data value and a repeat value from the variable length compressed data; and
   replicating the data value according to the repeat value to decompress the variable length compressed data.

3. The method of claim 2, wherein the extracting comprises reading the data value and the repeat value from a texture map using texture coordinates that are specified by the single input vertex.

4. A method for using a geometry shader unit to decompress variable length compressed data and restore the data, comprising:
   compressing the variable length compressed data by a first multithreaded processing core configured as a first geometry shading unit;
   receiving a single input vertex that specifies the variable length compressed data of a first length by a second multithreaded processing core that is configured as a second geometry shading unit;
   reading the variable length compressed data by the second geometry shader unit; and
   decompressing the variable length compressed data using the second geometry shader unit to produce the data of a second length, wherein the second length is greater than the first length.

5. The method of claim 4, further comprising the step of transmitting the variable length compressed data from the first multithreaded processing core to the second multithreaded processing core over a network.

6. The method of claim 1, wherein the variable length output data is read from a stream-out buffer.

7. The method of claim 1, further comprising the step of reading the first length that is stored with the variable length compressed data.

8. The method of claim 1, further comprising the step of disabling clamping operations prior to the decompressing of the variable length compressed data.

9. The method of claim 1, further comprising the step of setting view transforms to identity prior to the decompressing of the variable length compressed data.

10. The method of claim 1, further comprising the step of disabling lighting effects prior to the decompressing of the variable length compressed data.

11. A non-transitory computer readable medium including instructions that when executed by a geometry shader unit, cause the geometry shader unit to decompress variable length compressed data and restore the data, by performing the steps of:
receiving a single input vertex that specifies the variable length compressed data of a first length;
reading the variable length compressed data;
decompressing the variable length compressed data using the geometry shader unit to produce the data of a second length, wherein the second length is greater than the first length receiving an input vertex that specifies the input data of a first length;
rasterizing the data of a second length to generate fragments; and
transforming the fragments using the fragment processing unit to produce shaded fragments.

12. The computer readable medium of claim 11, further comprising the steps of:
extracting a data value and a repeat value from the variable length compressed data; and
replicating the data value according to the repeat value to decompress the variable length compressed data.

13. The computer readable medium of claim 12, wherein the extracting comprises reading the data value and the repeat value from a texture map using texture coordinates that are specified by the single input vertex.

14. A non-transitory computer readable medium for using a geometry shader unit to decompress variable length compressed data and restore the data, comprising:
compressing the variable length compressed data by a first multithreaded processing core configured as a first geometry shading unit;
receiving a single input vertex that specifies the variable length compressed data of a first length by a second multithreaded processing core that is configured as a second geometry shading unit;
reading the variable length compressed data by the second geometry shader unit; and
decompressing the variable length compressed data using the second geometry shader unit to produce the data of a second length, wherein the second length is greater than the first length.

15. The computer readable medium of claim 14, further comprising the step of transmitting the variable length compressed data from the first multithreaded processing core to the second multithreaded processing core over a network.

16. The computer readable medium of claim 11, wherein the variable length output data is read from a stream-out buffer.

17. The computer readable medium of claim 11, further comprising the step of reading the first length that is stored with the variable length compressed data.

18. The computer readable medium of claim 11, further comprising the step of disabling clamping operations prior to the decompressing of the variable length compressed data.

19. The computer readable medium of claim 11, further comprising the step of setting view transforms to identity prior to the decompressing of the variable length compressed data.

20. The computer readable medium of claim 11, further comprising the step of disabling lighting effects prior to the decompressing of the variable length compressed data.

* * * * *